Jan. 16, 1968     O. LUTHI     3,363,774
ROTARY DRUM FILTER

Filed April 12, 1965     9 Sheets-Sheet 1

INVENTOR.
OSCAR LUTHI
BY
David W. Tilbott
ATTORNEY

Jan. 16, 1968     O. LUTHI     3,363,774
ROTARY DRUM FILTER

Filed April 12, 1965     9 Sheets-Sheet 3

INVENTOR.
OSCAR LUTHI
BY
ATTORNEY

INVENTOR.
OSCAR LUTHI

INVENTOR.
OSCAR LUTHI
BY
David W. Tilbott
ATTORNEY

Jan. 16, 1968  O. LUTHI  3,363,774
ROTARY DRUM FILTER
Filed April 12, 1965  9 Sheets-Sheet 7

INVENTOR.
OSCAR LUTHI
BY
David W. Tibbotts
ATTORNEY

Jan. 16, 1968      O. LUTHI      3,363,774
ROTARY DRUM FILTER

Filed April 12, 1965      9 Sheets-Sheet 8

INVENTOR.
OSCAR LUTHI
BY
David W. Tillotson
ATTORNEY

Jan. 16, 1968  O. LUTHI  3,363,774
ROTARY DRUM FILTER

Filed April 12, 1965  9 Sheets-Sheet 9

INVENTOR.
OSCAR LUTHI
BY
David W. Tillott
ATTORNEY ered Jan. 16, 1968

3,363,774
ROTARY DRUM FILTER
Oscar Luthi, Nashua, N.H., assignor to Improved Machinery, Inc., Nashua, N.H., a corporation of Delaware
Filed Apr. 12, 1965, Ser. No. 447,280
9 Claims. (Cl. 210—404)

ABSTRACT OF THE DISCLOSURE

A drum filter having an axial end valve and containing compartments located on its circumference enclosed by cover plates. The cover plates are arranged to provide an inlet slot opening into each compartment located adjacent the trailing end of that compartment. Each conduit leading from a compartment to the axial end valve is positioned in a circumferential direction so that a major portion of the volume contained in the conduit and its compartment rotates ahead of an angular plane extending through the compartment slot. Liquid contained in the conduit and in the compartment is substantially prevented by the cover plate from draining by gravity out of the slot throughout a substantial portion of the rotary downward travel of the filtrate compartment from its highest position in the rotary path of the filter drum.

---

This invention relates to drum filters and more particularly to a novel construction of the filter surfaces and underlying filtrate compartments of a rotary drum filter.

A conventional rotary drum filter, such as is commonly used in the separation of wood pulp from its filtrate, has a generally cylindrical shape of dimensions up to about 30 feet long and 14 feet in diameter and is supported to rotate partly submerged in a slurry contained in a suitable vat. The outer surface of the drum is provided with radial ribs about 2 to 8 inches high mounted on the drum extending generally longitudinally thereof and spaced apart by about 2 to 5 inches. The ribs define elongate filtrate compartments located around the circumference of the drum. These ribs support on their outer edges spaced wires wound circumferentially about the drum supporting a screen of suitable mesh forming the filtering surface. The spaces between the ribs are usually connected, either centrally or at their ends, individually or in groups, to a plurality of drainage conduits located inside the drum and angularly spaced about the drum. Normally, these drainage conduits are connected to an outlet valve arranged to apply reduced pressure to selected arcuate segments of the filter surface during the rotation of the drum.

When using the foregoing drum filter with wood pulp, it operates to accrete a cake of wood pulp on its circumferential surface and to separate the wood pulp from its filtrate. If desired, the cake of wood pulp can be washed while on the drum filter by providing showers stationed about the drum. The filter drum may also have means providing for the elimination of the suction and/or application of positive pressure from the arcuate segment of the drum surface where the filter cake is being discharged by a doctor or other suitable means.

In a typical cycle of operation of the foregoing prior art drum filter, assuming clockwise rotation of the drum, suction is applied to the drainage conduits connected to the drum surface between its 4 o'clock to 8 o'clock positions to suck filtrate from the wood pulp slurry through the filter surface and so accrete the filter cake on the drum filter surface. As the drum surface moves between its 8 and 10 o'clock positions, the suction extracts water from the cake and pulls air through the cake to dry it. A shower may be applied at the 10 o'clock position of the drum and again the cake is either dried or more showers or press rolls used for washing or thickening the cake as the drum rotates from the 10 to 2 o'clock positions. At approximately the 2 o'clock position of the drum, atmospheric air may be introduced into the drainage conduits during the discharge of the filter cake from the drum by the usual scraper blade or other devices. The atmospheric air introduced during the discharge of the filter cake has to be removed by the vacuum source before the cycle can begin again.

Such drums have serious limitations, both as to construction and operation, which are solved by the novel construction of the present invention.

One of the more important of the operational limitations of drum filters of the foregoing conventional construction is the inability to achieve sufficiently rapid removal of water and other liquid from all passages adjacent the filter cake. Water or other liquid passing through the filter cake has to pass through the covering wire screen into the channels between the ribs, be accelerated as it passes along the channels between the ribs and beneath the filter cake for distances varying up to about 15 feet to the inlets of the drainage conduits in the drum and thence has to travel along the drainage conduits in the drum to the outlet valve. Not only does much of the liquid have to be moved axially of the drum for relatively great distances, but the gravity separation of air and liquid in the channels interferes with and slows movement of the liquid along the channels. This slow liquid movement is responsible for causing incomplete removal of filtrate and wash water from the filter cake during the cake drying operation.

In addition to the drainage of the liquid along the channels being slow, it also tends to be incomplete and therefore causes reblotting or rewetting of the filter cake by reabsorption of the undrained liquid into the filter cake lying over the channels, particularly when the reduced pressure is released for cake removal. For these reasons, removal of liquid from the cake between washing stages is incomplete, thus decreasing the efficiency of the washing operations, particularly when counter-current flow of wash water is employed. Even more important, removal of liquid from the filter cake before discharge of the cake is by no means as complete as desired.

Due to the incomplete drying of the filter cake during and after passing the washing stations, it tends to stick to the drum at the cake discharge station even though the vacuum is released on the drainage conduits. This is caused by the inability of sufficient air to pass through the relatively wet cake to relieve the vacuum beneath the cake, as it approaches the discharge station, in conjunction with the secondary vacuum applied to the filter cake by the weight of liquid draining from the discharge conduits. In addition, liquid remaining in the channels and discharge conduits tends to drain by gravity from the channels into the cake, thus rewetting the cake as it approaches the cake discharge station and before the cake is removed, which causes further trouble by making the cake weaker and thus more likely to break at the cake discharge station.

After the drum surface passes the cake discharge station and prior to submergence in the slurry, liquid remaining in the channels and drainage conduits drains therefrom by gravity causing the drainage conduits to be empty at submergence. This is undesirable because the air trapped in the drainage conduits at submergence prevents the vacuum system from rapidly reapplying vacuum to the drum periphery, when the vacuum system is reconnected to the drainage conduits by the outlet valve, thus interfering with the accretion of the new cake on the drum. Trapped air in the filtrate also interferes with the flow of filtrate in the drainage conduits during the formation of the cake. Finally, the trapped air places an additional load on the vacuum system.

The principal object of this invention is to provide a drum filter which substantially eliminates or greatly minimizes the foregoing problems.

Particular objects of this invention are: to provide a drum filter construction in which liquid is rapidly removed from passages adjacent the filter cake being formed on the drum; to provide a drum filter construction which substantially reduces "reblotting" or "rewetting" of the filter cake before it is removed from the drum; to provide a drum filter which greatly increases the removal of liquid from the filter cake between washing stations; to provide a drum filter construction which does a much better job of drying the filter cake before the cake is discharged; to provide a drum filter construction which completely releases the filter cake at the cake discharge station, without the occurrence of a secondary vacuum beneath the cake as a result of liquid draining from the drainage conduits in the drum; to provide a drum filter construction which maintains the drainage conduits and filtrate compartments substantially filled with liquid as the drum approaches submergence so that a vacuum can be applied to the drum surface more rapidly and the vacuum system does not have to handle large amounts of air trapped in the drainage conduits; and to provide a drum filter construction which minimizes the problem of air being trapped in the drainage conduits of the drum during submergence.

In general, the foregoing objects are attained by providing a cylindrical drum with a series of elongate and arcuate cover plates spaced angularly about the drum and extending lengthwise along the drum periphery. Means is provided on top of the cover plates to support a foraminous sheet filter medium in spaced relationship from the cover plates and to form a series of circumferentially extending filtrate drainage passages on top of the cover plates. The drum interior is constructed to form an elongate filtrate compartment beneath each cover plate and a drainage conduit means for selectively applying reduced pressure to each filtrate compartment as the drum rotates. The cover plates are arranged to provide an elongate drainage slot adjacent the trailing edge of each cover plate to serve as an inlet for fluid to flow from the drainage passages on top of the cover plate to the compartment below that cover plate. The major portion of the space or volume in each compartment and its cooperating drainage conduit means is located to rotate ahead of an axial plane extending through the drainage slot of that compartment so that the filtrate in the compartment is prevented from gravitationally flowing out the slot as the compartment rotates from the 12 o'clock to the 3 o'clock positions of the drum, looking at the drum in an axial direction and with the drum rotating in a clockwise direction.

The invention is described in the accompanying drawings wherein.

Figure 1:
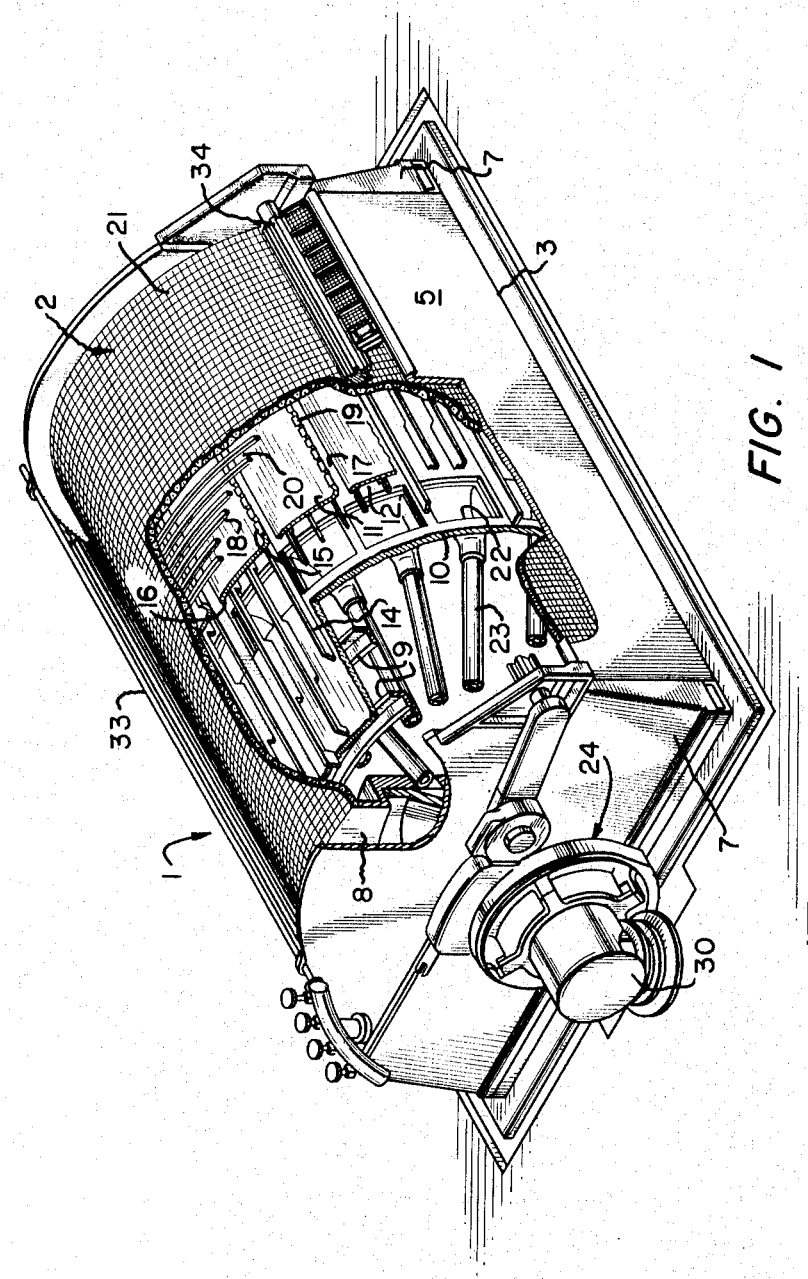
FIG. 1 is a perspective view of a rotary drum filter constructed in accordance with this invention and having portions cut away.

The rotary drum filter 1 shown in FIG. 1 includes a rotary drum 2 rotatively mounted in a support base 3. The support base 3 includes a lower portion 4 and upstanding peripheral walls forming a vat 5 surrounding the drum 2 for containing a liquid slurry. Usually, the lower portion 4 of the base 3 is depressed in a shallow pit formed in the floor surrounding and supporting the drum filter 1. The base 3 further includes support pedestals 7 located at opposite ends of the drum 2 outside the vat 5 for rotatively supporting the opposite ends of the drum 2. All of the foregoing structure is conventional in the rotary drum filter art.

The drum 2 is composed of a pair of axially spaced end walls 8, a plurality of axially spaced intermediate support rings 9 located between the end walls and a cylindrical circumference or periphery 10 attached to the drum end walls 8 and the support rings 9. Although the drawing does not show such structure, the drum 2 may contain additional reinforcing structure to give it sufficient strength and rigidity for serving its function.

A plurality of elongate and arcuate cover plates 11 are angularly spaced around the periphery 10 of the drum 2. The cover plates 11 are arranged to extend longitudinally along the drum and are radially spaced from the drum periphery 10 to form corresponding filtrate compartments 12 underneath the cover plates 11. The cover plates 11 are attached on radial ribs 14 fixed on and extending longitudinally along the cylindrical circumference 10 of the drum 2.

Figure 4:
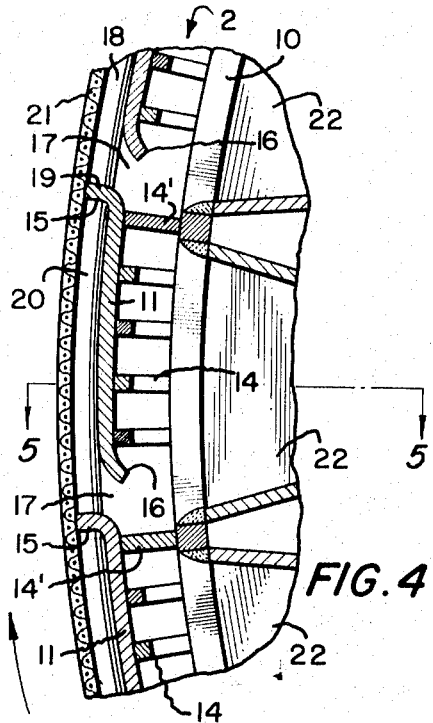
FIG. 4 is an enlarged fragment of FIG. 3 showing the details of a portion of the periphery of the rotary drum filter.

Each of the cover plates 11 includes a leading longitudinal edge 15 and a trailing longitudinal edge 16. The application of the terms "leading" and "trailing" to the longitudinal edges of the cover plates 11 corresponds to the normal direction of rotation of the drum 2. FIG. 4 shows a portion of the cylindrical drum circumference 10 which normally rotates in a clockwise direction, as shown by the arrow, with the leading edge 15 of each cover plate 11 normally rotating ahead of the trailing edge 16 of the corresponding cover plate.

The radial ribs 14 located on the drum intermediate the leading and trailing edges 15 and 16, respectively, of each cover plate 11 are perforated so that fluid can flow circumferentially through the ribs. The rib 14′ supporting the leading edge 15 of each cover plate 11 is solid or nonperforated to form a closed wall between adjacent filtrate compartments 12. The trailing edge 16 of each cover plate 11 is circumferentially spaced from the adjacent cover plate 11, as shown in FIG. 4, to provide a longitudinally extending filtrate drainage slot 17 adjacent the trailing edge 16 of each cover plate. The slot 17 serves as an inlet for fluid located on top of each cover plate 11 to flow into the corresponding filtrate compartment 12 underneath that cover plate 11. It should be understood that the ribs 14 and 14' and cover plates 11 are suitably attached to the drum circumference 10 by conventional means, such as welding.

Figure 5:
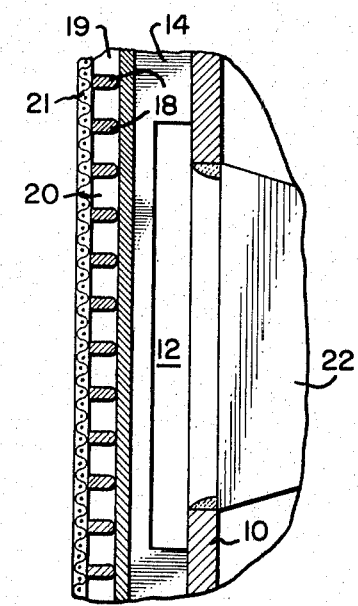
FIG. 5 is a section taken on line 5—5 of FIG. 4.
Figure 3:
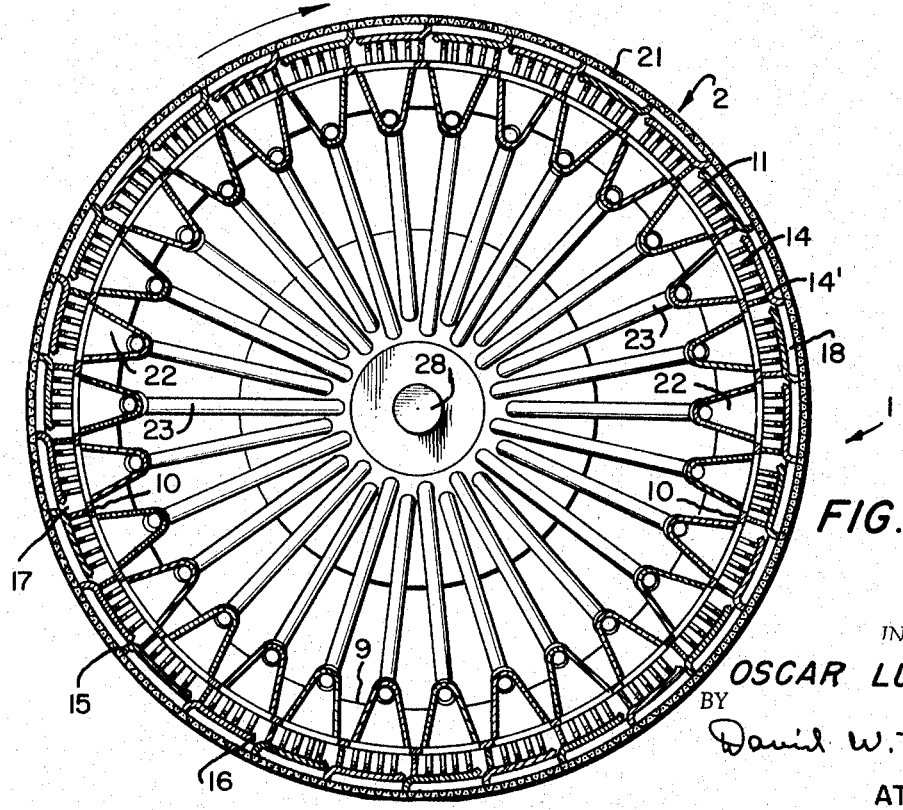
FIG. 3 is a section taken on line 3—3 of FIG. 2.
Figure 7:
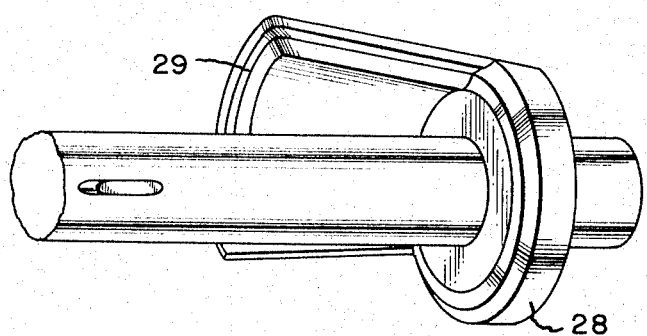
FIG. 7 is a fragmentary perspective view of the vacuum outlet valve shown in FIG. 6.

A series of axially spaced wires 18 are circumferentially wound about the top faces of the cover plates 11, as shown in FIGS. 4 and 5. The wires 18 may be axially spaced apart by a distance of ¼ to ⅜ inches. Generally, the wires 18 are flat on their top and side surfaces while being round on their bottoms, as shown in FIG. 5. The leading edge 15 of each cover plate includes an upstanding lip 19 extending radially outward and containing corresponding notches for receiving the wires 18 to space them apart and prevent them from twisting or turning to lie on their sides. The spaces between the wires 18 on top of each cover plate 11 serve as arcuate drainage passages 20 running circumferentially across the top of the cover plate 11 from its lip 19 to its drainage slot 17, as shown in FIG. 4.

A filter screen 21 having a suitable mesh is wrapped around the circumferential wires 18 on the drum 2 and attached thereon in a conventional manner. As is well known in the art, the screen 21 serves as a surface for accreting the fibers in a liquid slurry into a fiber mat or "cake" during the operation of the rotary drum filter 1.

Conduit means is provided within the drum 2 for selectively applying a reduced pressure (vacuum) to each of the filtrate compartments 12 during selected portions of the rotary path of the drum 2. This means is conventional in the art; although it forms no part of this invention, it is described in order to adequately explain the invention.

Figure 2:
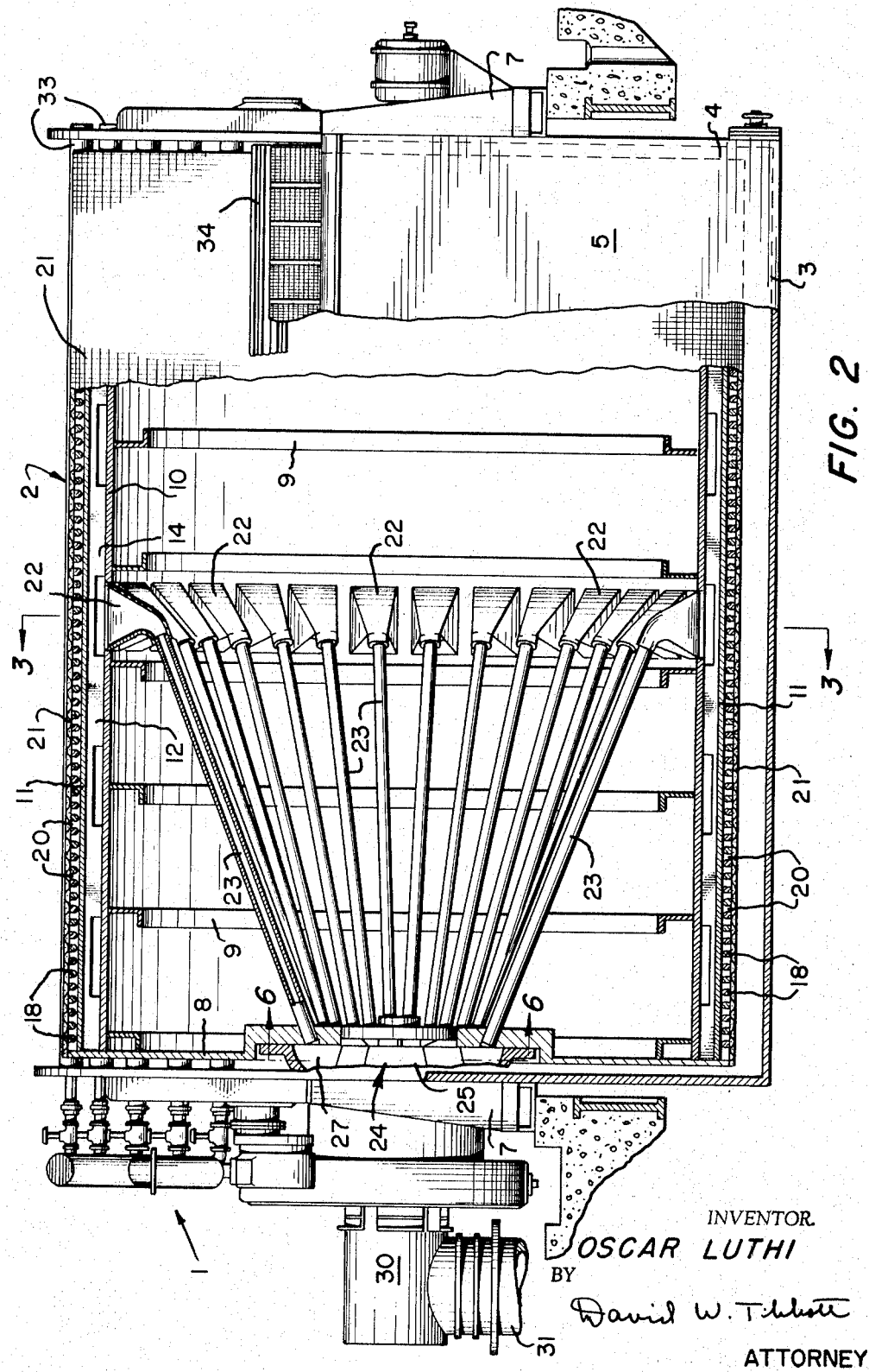
FIG. 2 is a side elevational view with portions cut away of the rotary drum filter shown in FIG. 1.

Looking at FIGS. 1 and 2, each filtrate compartment 12 opens intermediate of its length into a drainage conduit. This conduit includes a funnel 22 opening into the compartment 12 midway of the length of the drum 2 and a drainage pipe 23 having one end connected to the funnel 22. The exit end of the drainage pipe 23 is connected to an outlet valve 24 located at one end of the drum 2 adjacent its axis.

Figure 6:
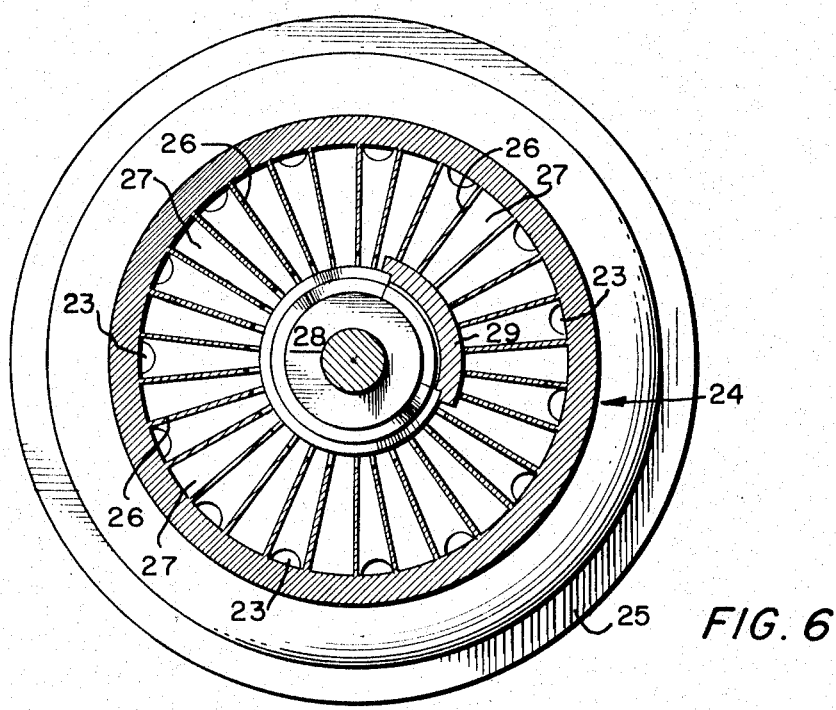
FIG. 6 is a section taken on line 6—6 of FIG. 2 illustrating the details of the outlet valve controlling the selective application of vacuum to the periphery of the rotary drum filter.

The outlet valve 24 includes an annular valve housing 25, shown in FIG. 6, containing a series of radial partitions 26 forming individual valve chambers 27 connected to the exit ends of the pipes 23. The valve housing 25 is fixed to the drum 2 and rotates with it. The inner edges of the partitions 26 terminate along the periphery of a conical space containing a rotary valve plug 28. The valve plug 28 is adapted to remain stationary while the drum 2 and valve housing 25 rotate around it. The valve plug 28 contains a valve segment 29 adapted to wipe the inner edges of the partitions 26 and close the valve chambers 27 as they rotate over the valve segment 29. The valve plug 28 can be adjusted to open or close the valve chambers 27 at any desired portion of the rotary travel of the drum 2.

The center or exit opening of the annular valve housing 25 is connected by an elbow 30 to a vacuum pipe 31, shown in FIG. 2, running to a vacuum source (not shown). Means is provided in the elbow 30 for supporting the valve plug 28 in an adjusted stationary position while the drum rotates. Suitable seals are mounted between the valve housing 25 and elbow 30 to seal the intervening joint. The function and operation of the outlet valve means will be explained further in the description of the operation of the machine.

Figure 8:
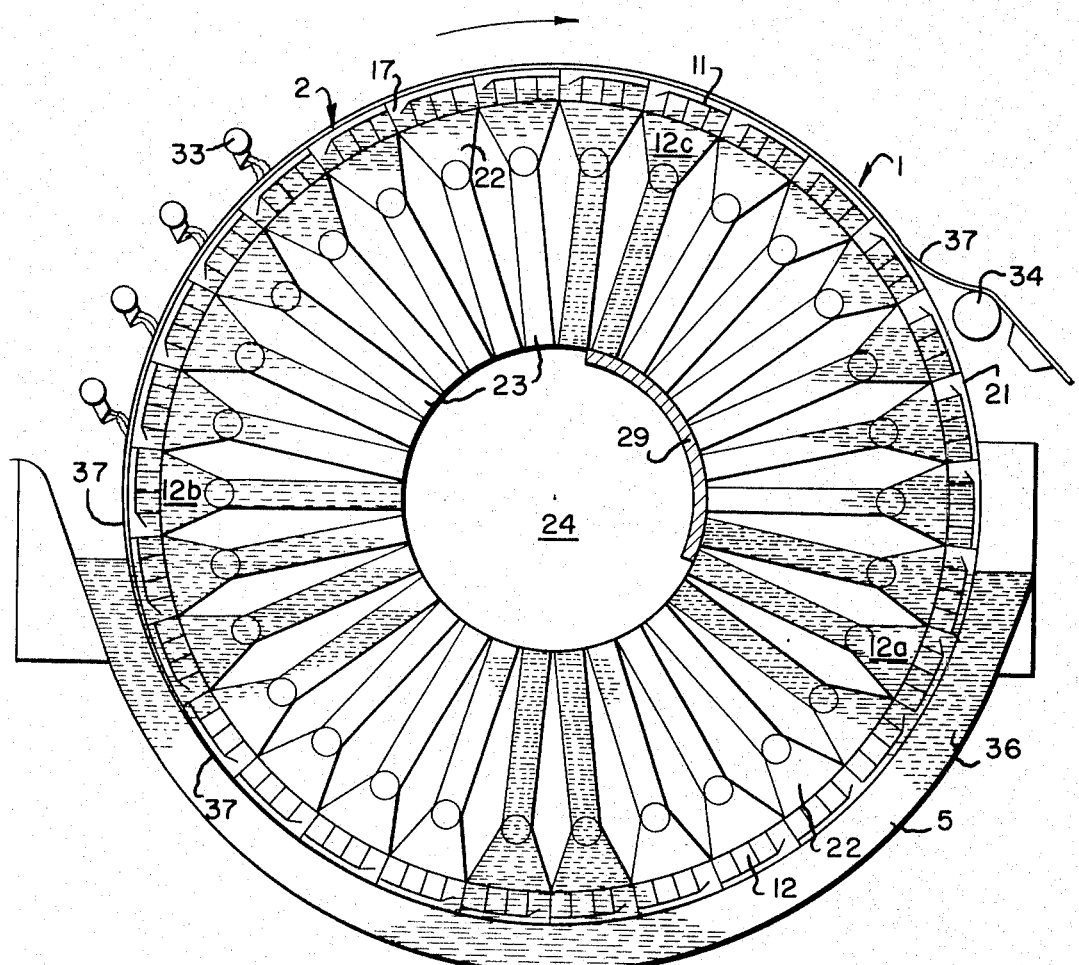
FIG. 8 is a schematic cross section of the rotary drum filter illustrating its operation.

Looking at FIGS. 1, 2, and 8, the rotary drum filter 1 is shown with a series of conventional washers or showers 33 extending across the length of the drum 2 in an upper quadrant of the drum circumference located near the point that the drum periphery emerges from the vat 5 during its normal direction of rotation. Looking at FIG. 8, the showers 33 can be described as located near the 10 o'clock position of the drum 2. A conventional "cake" take-off roll 34 is located near the 2 o'clock position of the drum 2 for removing the cake or mat from the drum periphery before the drum periphery is again submerged in the vat 5.

Operation

The operation cycle of the principal embodiment will be explained in connection with FIG. 8. FIG. 8 shows the drum 2 rotating in the vat 5 in a clockwise direction as indicated by the arrow. It will be assumed that the vat 5 contains a slurry 36 which normally is a mixture of wood pulp and a liquid termed "filtrate." A reduced pressure or vacuum is applied to the outlet valve 24, by means of the vacuum pipe 31 shown in FIG. 2. The valve 24 applies this vacuum pressure to all of the drainage pipes 23 extending from about the 4 o'clock position of the drum clockwise to about its 12 o'clock position. The valve 24 bars the vacuum pressure from the pipes 23 located in the portion of the drum lying between its 12 o'clock and 4 o'clock positions. This restraining of the vacuum pressure is accomplished by the valve segment 29 closing the exit ends of the drainage pipes 23, which also serves to stop the filtrate in the pipes 23 from draining into the valve 24 during the rotation of the pipes 23 between the 12 o'clock and 4 o'clock positions of the drum.

As the drum 2 rotates in its clockwise direction, its periphery is submerged in the slurry 36 at about the 3 o'clock position. As each filtrate compartment 12 reaches the 4 o'clock position, the valve 24 starts applying vacuum pressure to the compartment 12 through its funnel 22 and drainage pipe 23. In FIG. 8, the compartment indicated by 12a has just been placed under the vacuum pressure.

This vacuum begins drawing or sucking the pulp and filltrate against the filter screen 21. The pulp cannot pass through the screen 21 while the filtrate liquid continues through the screen 21. The filtrate is drawn along the circumferential passages 20, between the axially-spaced screen supporting wires 18, and through the drainage slot 17 into the elongate filtrate compartment 12. The filtrate in the compartment 12 flows longitudinally along the drum periphery 10 to the funnel 22 and into the drainage pipe 23. Such filtrate will continue through the valve 24 and into the vacuum pipe 31 toward the vacuum pressure source (not shown) in a conventional manner. Normally, the vacuum source is a "barometric leg," which is merely a vertical length of pipe containing downwardly flowing liquid creating a suction at the top end of the pipe. It will be understood that ultimately the filtrate in the pipe 31 will flow into a container (not shown) where it can be reused.

As the filtrate compartments 12 rotate through the slurry 36, the wood pulp is deposited or accreted on the screen 21 to form a web of wood fibers termed a "cake" 37. It will be understood that the cake 37 is built-up progressively until it emerges from the slurry 36 at about the 8 o'clock position of the drum periphery. FIG. 8 shows the compartment 12b emerging from the slurry 36.

After the cake 37 emerges, the vacuum pressure below the screen 21 continues to draw filtrate from the cake 37 into the passages 20, through the slot 17 and into the compartments 12. Because of the continued application of vacuum to the compartments, this withdrawal of filtrate from the cake 37 will continue until the cake passes the 12 o'clock position. During this time, the cake may be washed at several stations by the showers 33.

As the cake 37 passes the 12 o'clock position, the valve segment 29 will close the drainage pipes 23 to stop the application of vacuum to the underside of the cake. Looking at FIG. 8, the compartment 12c has just been closed to the vacuum pressure by the valve segment 29. At the same time, the filtrate remaining in the compartments 12 and corresponding drain pipes 23 will be sealed from draining into the valve 24.

As the cake 37 travels from the 12 o'clock position to the take-off roll 34, where it is removed from the filter screen 21, the filtrate in the compartments 12 is prevented from flowing by gravity out of the compartments 12 by the cover plates 11, which form an outer vertical wall for each compartment 12 in this position of the drum. The cover plates 11 continue to bar the drainage of filtrate from the compartments after the cake 37 is removed and the compartments pass the 3 o'clock position to be again submerged in the slurry 36.

As a result of the cover plates 11 preventing the filtrate from gravitationally flowing from the compartments 12 during their travel from the 12 o'clock to 3 o'clock positions, the cake 37 is not "rewetted" as it approaches the take-off roll 34. Thus, the cake 37 is much dryer as it is taken from the drum which is more desirable for several reasons. Being dryer, the cake is less likely to stick to the screen. Also, the cake is stronger; hence, it is less likely to break as it is removed. Finally, the fact that the cake is dryer indicates that the washing of the cake is more efficient.

Another advantage provided by the cover plates 11 is that each compartment 12 is substantially full of filtrate as it is submerged, which allows the reapplication of vacuum to the compartments 12 to take effect faster since the vacuum system does not have to handle much air. Furthermore, reducing the amount of air trapped in the compartments 12 reduces the load on the vacuum system.

During the drying of the cake 37, after it emerges from the slurry 36, liquid or filtrate is rapidly removed from the passages 20 on top of the cover plate 11 into the underlying compartment 12. This arrangement has been found to provide a faster and more effective cake washing and drying operation compared to prior art arrangements.

Figure 9:
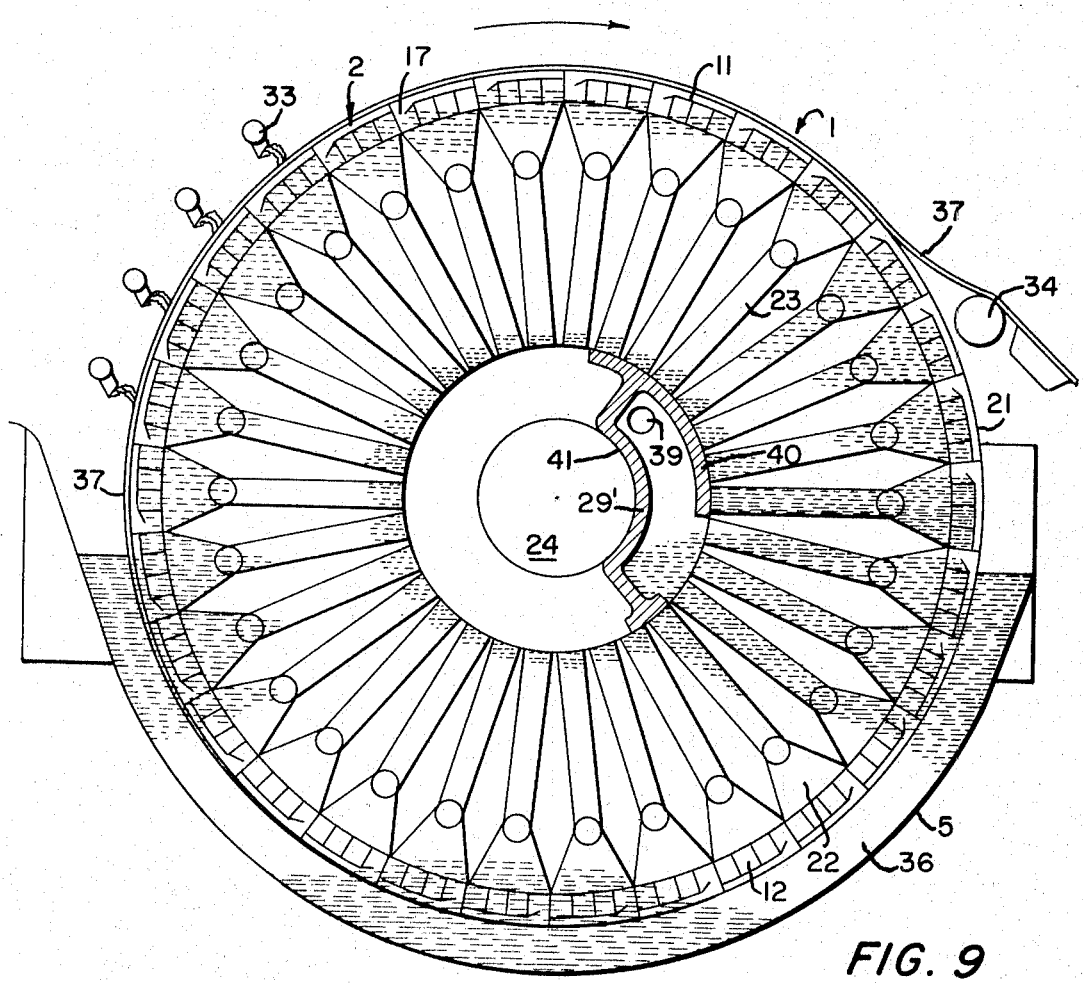
FIG. 9 is a cross section similar to FIG. 8 illustrating the operation of a second embodiment of rotary drum filter.
Figure 11:
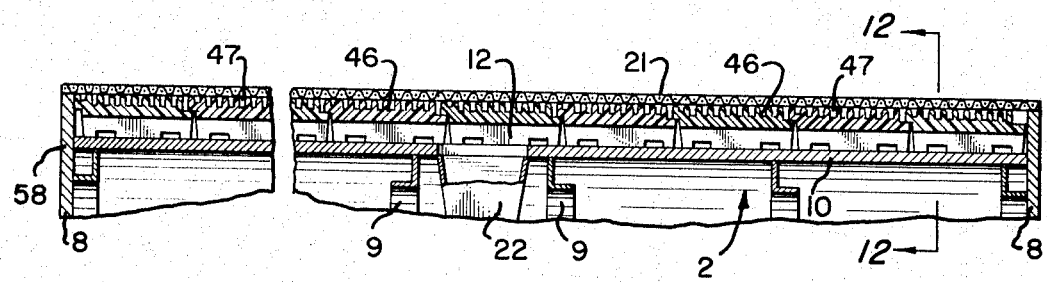
FIG. 11 is a section taken on line 11—11 of FIG. 10.

*Second embodiment—FIG. 9*

A second embodiment is shown in FIG. 9. The only difference between FIG. 9 and the first embodiment is the provision of the valve segment 29', in FIG. 9, with an atmospheric vent 39. The outer arcuate wall 40 of the valve segment 29' serves to seal the drainage pipes 23 as the drum rotates from the 12 o'clock to the 3 o'clock positions. Thereafter, the drainage pipes 23 are open to the atmospheric vent or port 39 as they rotate from the 3 o'clock to the 5 o'clock positions. The inner wall 41 of the valve segment 29' divides the vacuum source from the vent 39. During the period that the pipes 23 are open to atmospheric pressure, the filtrate in the vat 5 can fill the compartments 12 and the pipes 23 as they are submerged; that is, venting the trapped air in the compartments 12 allows the filtrate to enter the compartments and seek its natural level without interference from trapped air. Under some conditions, this second embodiment will result in the compartments 12 and pipes 23 being more full of liquid prior to the reapplication of vacuum than would be the case in the first embodiment.

*Third embodiment—FIGS. 10 to 17*

The third embodiment of drum filter 45 shown in FIGS. 10 to 17 uses the same inventive concepts present in the first two embodiments but further includes an outer drum periphery or "deck" composed of a plurality of separate deck sections 46 detachably mounted on the drum circumference 10. The drum circumference 10 and the inner parts of the drum 2 are the same as in the first embodiment. The deck sections 46 take the place of the cover plates 11, the ribs 14 and the circumferential wires 18 previously described in connection with the first embodiment. Making the deck sections 46 removable allows them to be easily replaced, either individually or in total, in the case of damage or other failure, such as from corrosion.

Figure 10:
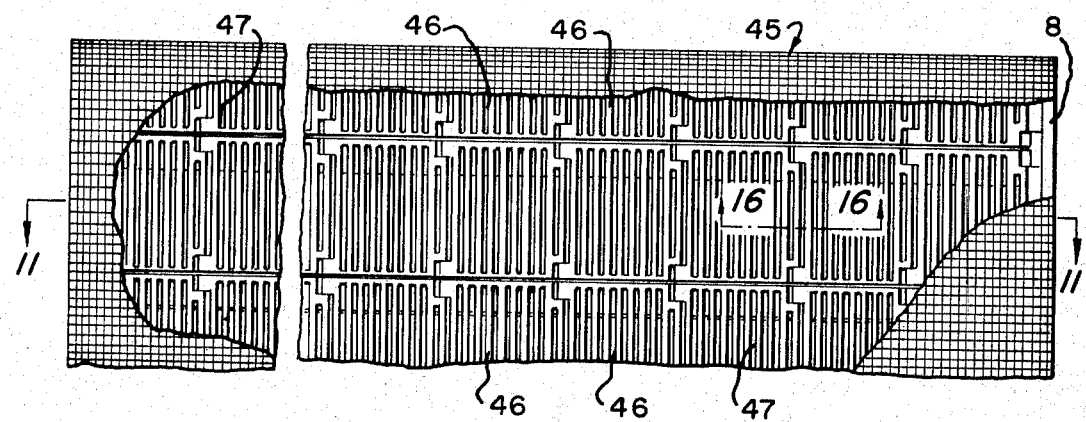
FIG. 10 is a fragmentary plan view with portions cut away of a third embodiment of drum filter utilizing a plurality of separate deck sections detachably mounted on the drum to form its outer circumference or periphery.

As shown in FIG. 10, a plurality of the deck sections 46 will be combined or joined in edge-to-edge relationship to form a plurality of longitudinal rows 47 circling the drum circumference 10. Each row 47 will form a single longitudinal filtrate compartment 12, which serves the same purpose as described in the first embodiment.

Each deck section 46 comprises a top surface 48 supported on a plurality of circumferentially spaced longitudinally extending ribs 49 resting on the circumference 10 of the drum 2. The intermediate ribs 49 contain openings 50 to allow liquid to pass through them while the edge ribs 49' at the opposite circumferential edges of the section 46 are solid or nonperforate.

The top face of the top surface 48 is provided with a series of axially spaced circumferentially extending grooves 52, corresponding to the drainage passages 20 shown in the first embodiment. The provision of the grooves 52 result in the formation of a plurality of circumferential ridges 53 located between the grooves 52. The grooves 52 are closed at each end on each section 46. A longitudinal drainage slot 54 is provided in the top 48 of each section adjacent one longitudinal edge of the section 46 for draining liquid from the grooves 52 into the filtrate compartment 12 located beneath the deck section 46. The sections 46 are mounted so that the drainage slots 54 are located adjacent the trailing edges of the sections, as is the case with the first embodiment. The ridges 53 are continuous between opposite edges of the section 46, thus bridging the drainage slot 54.

Figure 12:
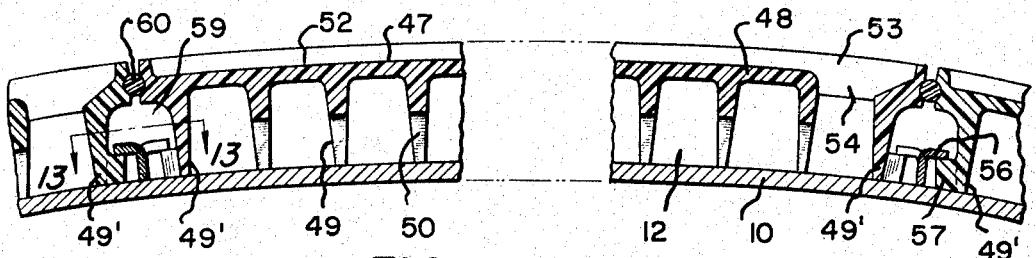
FIG. 12 is an enlarged fragmentary section taken on line 12—12 of FIG. 11.
Figures 13, 14:
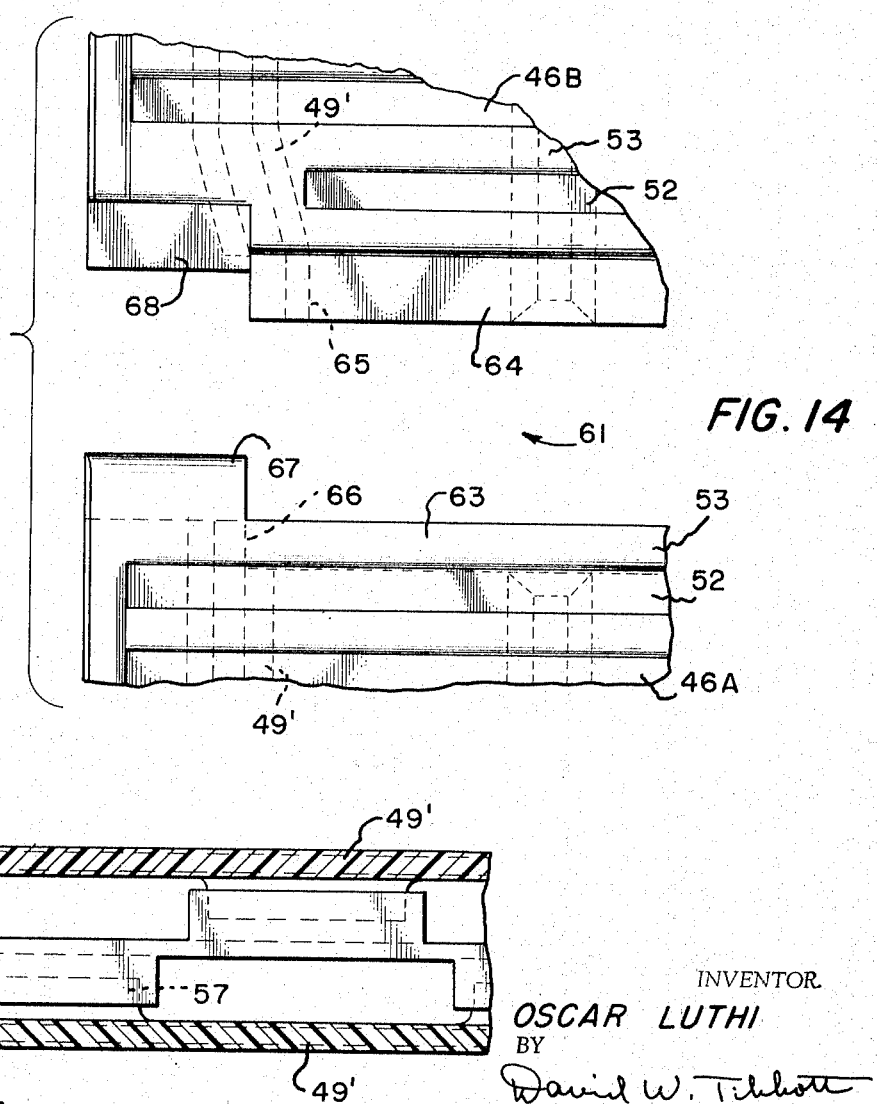
FIG. 13 is an enlarged fragmentary section taken on line 13—13 of FIG. 12.
FIG. 14 is a fragmentary, enlarged and exploded plan view of the interlocking corners of a pair of adjoining deck sections.
Figures 15, 16, 17:
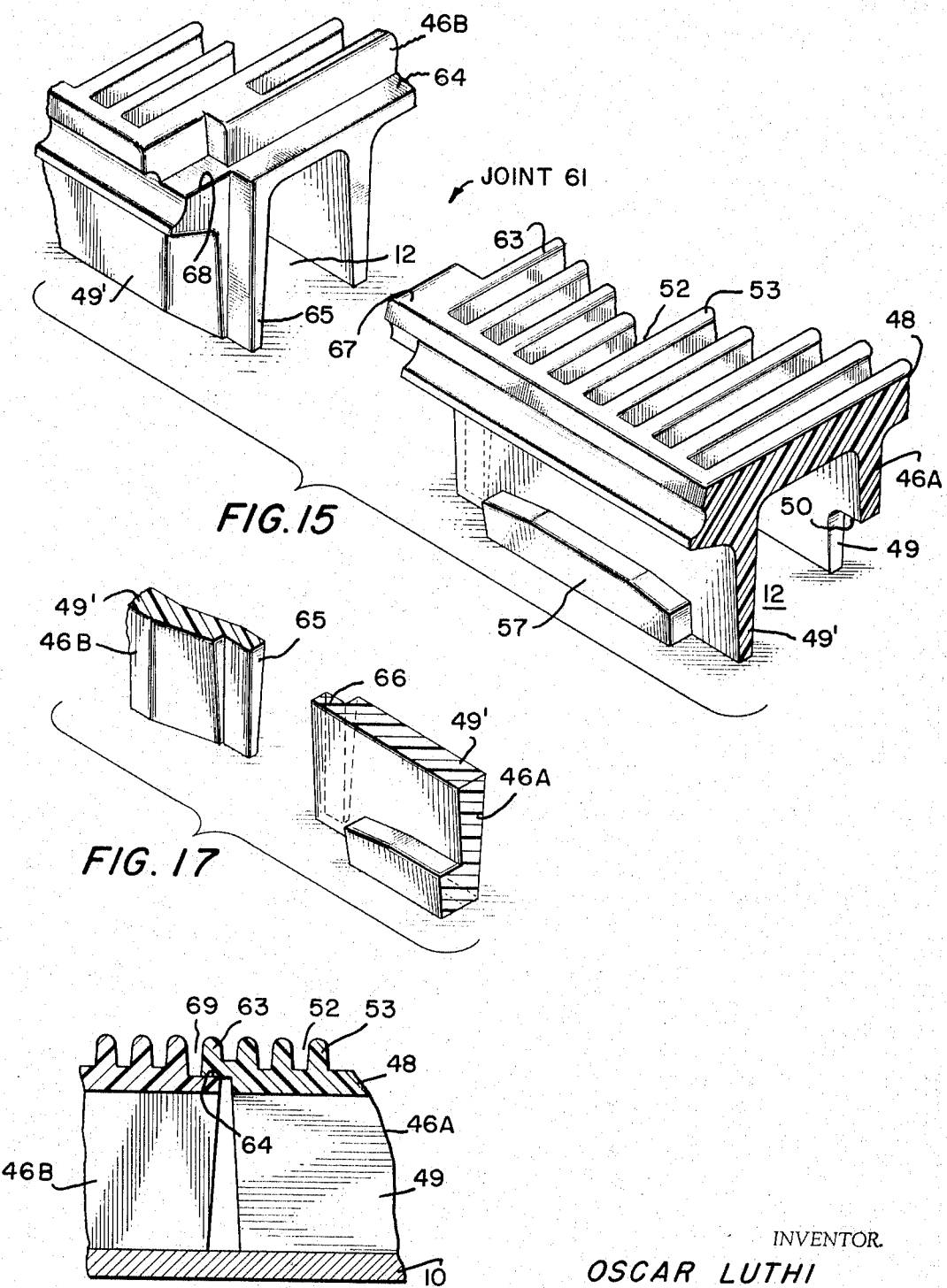
FIG. 15 is a fragmentary, exploded and perspective view of the structure shown in FIG. 14.
FIG. 16 is an enlarged fragmentary section taken on line 16—16 of FIG. 10.
FIG. 17 is an enlarged fragment of FIG. 15.

The deck sections 46 are attached on the circumference 10 of the drum by a bayonet-type joint, shown in FIGS. 12 and 13. A series of longitudinally-spaced, circumferentially projecting hooks 56 are fixed on the drum circumference 10 adjacent the edges of each row 47 of deck sections 46. The outer rib 49' of each deck section 46 contains tongues 57 adapted to slide longitudinally under the hooks 56, as the rows 47 of deck sections are slid lengthwise along the drum circumference 10. The tongues 57 are beveled on their ends to facilitate entry beneath the hooks 56, as shown in FIGS. 15 and 17.

The outer rim 58 of at least one of the drum ends 8 is detachable to allow the mounting and detachment of the deck sections 46 from the drum circumference 10, by sliding such sections longitudinally into position.

FIG. 12 illustrates the sealing of the cavity 59 between adjacent rows 47 of sections 46 by the insertion of a longitudinally-extending resilient bead 60 into mating grooves in the longitudinal edges of the deck sections 46.

The joint 61 between adjoining circumferential edges of the deck sections 46 in each row 47 must be a sealed joint 61 in order to prevent leakage between adjacent filtrate compartments 12 and to prevent substantial leakage from each compartment 12. The joint 61 is basically an overlapped joint and is illustrated in FIGS. 14 to 17.

The edge of a section 46A includes an extending lip 63 formed on its top surface 48 which slides on or seats on top of a shoulder 64 formed on the adjacent edge of the adjacent deck section 46B to form a seal along the top surface, as shown in FIG. 16. The edge ribs 49' also are overlapped at their ends. The edge rib 49' on section 46B includes an offset end portion 65 which overlaps an end portion 66 of the rib 49' on the section 46A. These expedients form a tightly sealed joint 61. The ends of the intermediate ribs 49 are not overlapped, as shown in FIG. 16.

In addition, the corners of the section 46A includes tongues 67 which slide into cooperating seats 68 formed on the section 46A to close the ends of the groove 69 formed along the top of the joint 61, as shown in FIG. 16.

Each of the deck section 46 can be integrally formed from a variety of suitable materials. For example, they can be molded from plastics. It is believed that the use of moldable plastic material will provide a much more economical drum filter construction.

The above embodiment using separate deck sections 46 can be utilized with either a single filter screen 21 wrapped around the entire drum or, alternately, each deck section can be covered with a separate piece of screening. In the latter case, when the deck sections 46 are composed of thermo-plastic material, a screen section can be stretched over the deck section 46 and attached to the border edges of the section 46 by a heat sealing technique similar to spot-welding.

It is desirable to arrange the deck sections 46 so that they can be mounted on the drum circumference 10 with either longitudinally extending edge of each section being its leading edge. As a result, the rotation direction of the drum filter can be reversed simply by reversing the deck sections 46.

Although several embodiments of the invention are illustrated and described in detail, it will be understood that the invention is not limited to these embodiments, but contemplates other embodiments and variations which utilize the concepts and teachings of this invention.

Having described my invention, I claim:

1. A rotary drum filter comprising:
   a cylindrical drum;
   a series of elongate and arcuate cover plates spaced angularly about said drum and extending lengthwise along the drum;
   means to rigidly support said cover plates on said drum;
   means on top of said cover plates to support a foraminous sheet filter medium in radially spaced relationship outward from said cover plates and to form a series of circumferentially extending filtrate drainage passages on top of said cover plates;
   said drum being mounted to rotate in a single rotary direction during operation so that each cover plate has leading and trailing longitudinally extending edges with the leading edge of each cover plate preceding the trailing edge of the same cover plate as said drum rotates in said single rotary direction;
   means in said drum to form an elongate filtrate compartment underneath each cover plate and extending the length of the drum, each filtrate compartment being located substantially between the leading and trailing edges of its cover plate;
   drainage conduit means for applying a reduced pressure to each of said filtrate compartments for draining filtrate from said compartments along selected portions of the rotary path of the drum;
   each of said cover plates being arranged to provide an elongate filtrate drainage slot adjacent to the trailing edge of that cover plate for draining filtrate from the drainage passages on top of that cover plate to the filtrate compartment located beneath the cover plate;
   the majority of space contained in each filtrate compartment being located between the drainage slot opening into said compartment and the leading edge of the cover plate over that compartment;
   valve means located substantially axially of said drum; and
   separate drainage conduits extending inwardly from each compartment to said valve means with each conduit being positioned in a circumferential direction so that the majority of the volume contained in said conduit rotates ahead of an axial plane extending through the slot of the compartment draining into said conduit as said drum rotates in said single rotary direction so that liquid contained in each filtrate compartment and its drainage conduit is substantially prevented by its cover plate from gravitationally flowing out said elongate filtrate drainage slot as the filtrate compartment travels from the 12 o'clock to the 4 o'clock positions of the drum, looking at the drum in an axial direction and rotating in a clockwise direction.

2. The drum filter of claim 1, wherein:
   said valve means is arranged to close the exit ends of the drainage conduits as they travel from about the 12 o'clock to the 3 o'clock positions of the drum to prevent the application of reduced pressure to the drainage conduits and to seal liquid in the drainage conduits.

3. The drum filter of claim 2 including:
   means located adjacent said valve and operative to vent the exit ends of the drainage conduits to atmosphere as the interconnected filtrate compartments travel from about the 3 o'clock to the 4 o'clock positions of the drum to eliminate the trapping of air in the drainage conduits as the corresponding filtrate compartments are submerged in a liquid slurry.

4. The drum filter of claim 1 wherein:
   each of said cover plates comprises a longitudinal row of sections detachably mounted in edge-to-edge relationship on said drum with each of said sections covering a separate filtrate compartment located wholly beneath that section.

5. The drum filter of claim 4 wherein:
   each of said sections includes integral ribs extending radially from its bottom face to support it on the drum in spaced relationship for forming said elongate filtrate compartments beneath said sections.

6. The drum filter of claim 5 wherein:
   each of said sections includes an integral imperforate rib projecting from its bottom face adjacent both the leading and trailing longitudinal edges of said section and forming the leading and trailing walls of the filtrate compartment located beneath that section.

7. The drum filter of claim 6 including:
   means providing joints between adjacent sections in each longitudinal row of sections which are sufficiently tight to prevent substantial fluid leakage therethrough.

8. The drum filter of claim 7 wherein:
   each of said sections is integrally formed of molded plastic material.

9. The drum filter of claim 8 wherein:
   each of said sections is adapted to be mounted on said drum with either longitudinal edge facing in a given circumferential direction.

References Cited

UNITED STATES PATENTS

| | | | |
|---|---|---|---|
| 2,362,300 | 11/1944 | Nyman | 210—395 X |
| 3,235,086 | 2/1966 | Krynski | 210—404 |
| 3,306,457 | 2/1967 | Putnam | 210—404 X |
| 3,306,460 | 2/1967 | Luthi | 210—404 |

SAMIH N. ZAHARNA, *Primary Examiner.*

REUBEN FRIEDMAN, *Examiner.*